No. 790,685. PATENTED MAY 23, 1905.
M. HENDRICKS.
HOSE COUPLING.
APPLICATION FILED MAR. 17, 1905.

2 SHEETS—SHEET 1.

Witnesses
C. P. Wright, Jr.
E. R. Peck

Inventor
Murray Hendricks
By Hubert E. Peck
Attorney

No. 790,685. PATENTED MAY 23, 1905.
M. HENDRICKS.
HOSE COUPLING.
APPLICATION FILED MAR. 17, 1905.
2 SHEETS—SHEET 2.
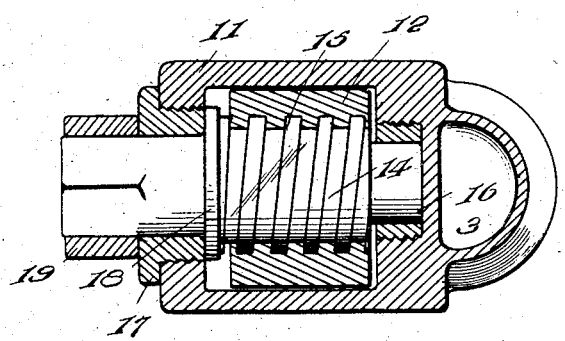
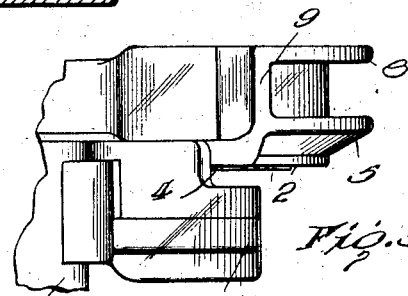
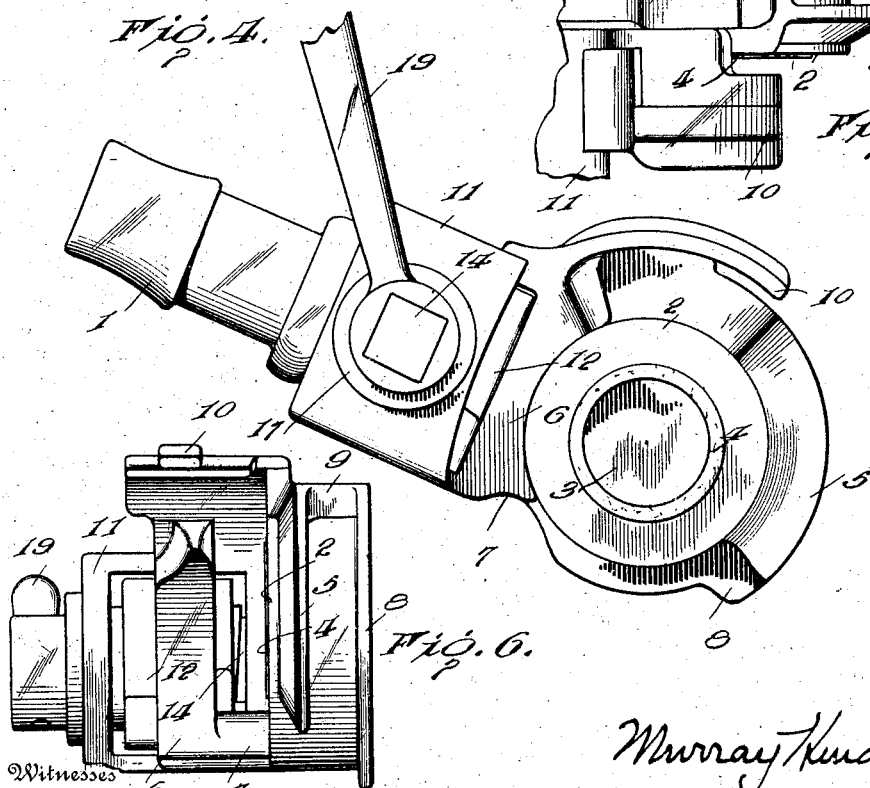
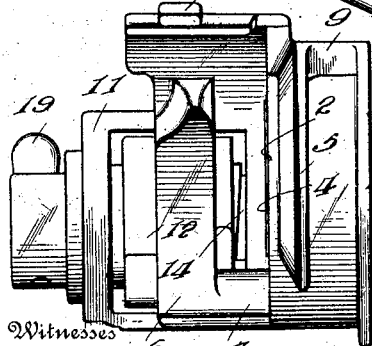
Witnesses
E. P. Wright Jr.
E. R. Peck
Inventor
Murray Hendricks
By Hubert E. Peck
Attorney No. 790,685.

Patented May 23, 1905.

UNITED STATES PATENT OFFICE.

MURRAY HENDRICKS, OF BENWOOD, WEST VIRGINIA.

HOSE-COUPLING.

SPECIFICATION forming part of Letters Patent No. 790,685, dated May 23, 1905.

Application filed March 17, 1905. Serial No. 250,581.

*To all whom it may concern:*

Be it known that I, MURRAY HENDRICKS, a citizen of the United States, residing at Benwood, Marshall county, West Virginia, have invented certain new and useful Improvements in Hose-Couplings; and I do hereby declare the following to be a full, clear, and exact description of the invention, such as will enable others skilled in the art to which it appertains to make and use the same.

This invention relates to certain improvements in hose-couplings particularly designed for use in train air-brake systems.

An object of the invention is to provide certain improvements in hose-couplings for the purpose of preventing the train operators or others from wedging or driving nails or other articles between the interlocking or engaging hooks or lugs of the opposing coupler-heads for compressing the gaskets when worn and which so lock and wedge the coupling-heads together that the hose-pipe sections are very often broken and rendered useless in uncoupling.

Another object of the invention is to provide a hose-pipe coupling wherein the coupling-heads are provided with improved means for drawing or locking the same together when the gaskets or packing-rings have become so worn that a tight joint will not be formed when the heads are locked together by the ordinary hooks or lugs and whereby such means can be readily released to permit easy and convenient uncoupling.

The invention consists in certain novel features in construction and in arrangements or combinations of parts, as more fully and particularly pointed out hereinafter.

Figure 1:
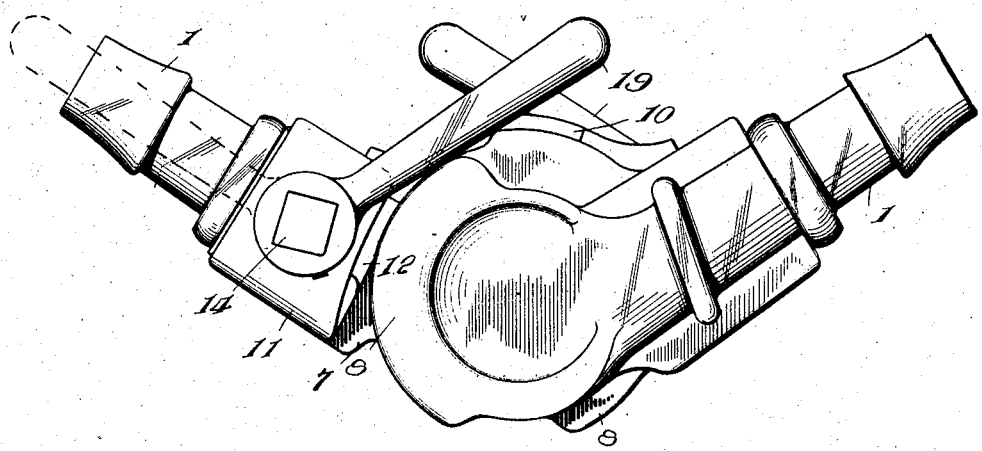
Figure 2:
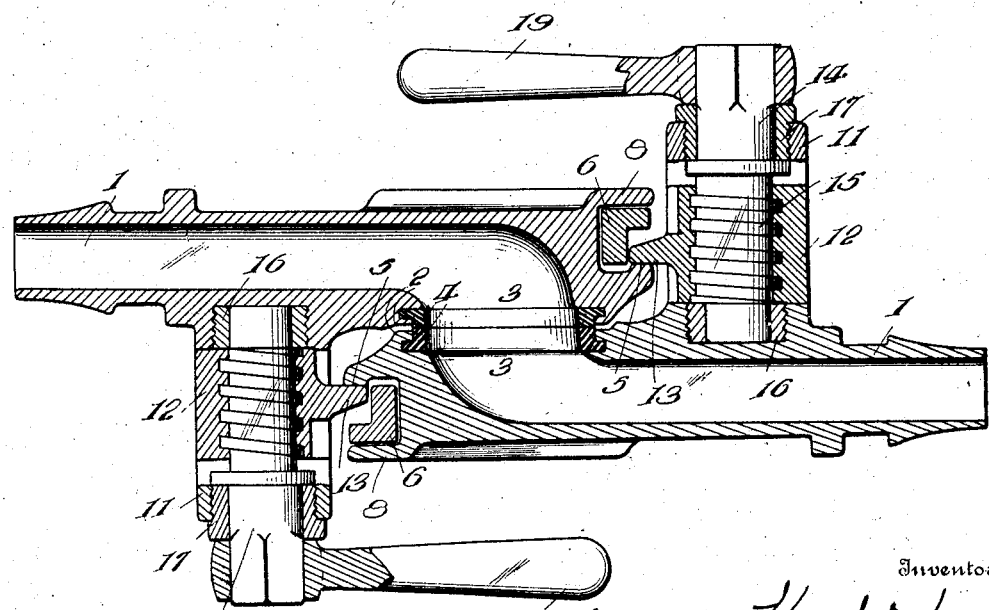

Referring to the accompanying drawings, which show for purposes of explanation an example of a construction, from among others, within the spirit and scope of my invention, Figure 1 is a side elevation showing two heads coupled together and the auxiliary compressing devices in operative clamping position. Fig. 2 is a longitudinal sectional view through the two heads as shown in Fig. 1. Fig. 3 is a detail cross-sectional view through one of the heads and through the auxiliary compressing device thereof. Fig. 4 is a detail elevation of one of the coupling-heads detached looking at the inner face thereof. Fig. 5 is a top plan view of one of the coupling-heads detached, portions thereof being broken away. Fig. 6 is a front end view of one of the coupling-heads detached.

The coupling consists of two similar heads, and description of one head will apply to the other. Each head consists of a hollow box or shell at one end, terminating in the hollow shank or thimble 1 to receive the hose section or pipe connected with the pipes of the car. The flat inner face 2 of the head is formed with the axial opening 3, permitting communication with the opposite coupling-head, and in order to form a tight joint between the two heads and prevent lateral leakage each head is provided with the packing-ring or gasket 4, of suitable elastic or other suitable packing material, confined to the coupling-head in any suitable manner and projecting outwardly through axial opening 3 and beyond the inner face 2. When the two heads are coupled together, the outer ends of the two gaskets 4 engage, and the gaskets should be thereby tightly compressed to form the desired air-tight joint between the two heads.

At its outer or free end or edge each head is formed with the ordinary or any other suitable hook, flange, or elongated lug 5, and between the thimble 1 and the inner face 2 each head is formed with the overhanging elongated hook, flange, or lug 6. The space between hook 6 and inner face 2 is at one end open to receive the hook 5 of the opposite head; but the opposite end of said space is completely closed by the rigid wall or abutment 7 between face 2 and said hook or flange 5. The hooks 5 and 6 are properly inclined and recessed about as ordinarily to move together axially and lock and unlock approximately in the ordinary manner and to cause the proper compression of the gaskets when the same are not unduly worn.

The gaskets of the hose-couplings commonly employed in air-brake systems become worn, and hence permit leakage when the heads are coupled together. Under such circumstances it is a common practice for the trainmen or operators to drive or wedge nails or other like bodies between the adjoining or interlocking faces of the hooks or flanges 5 and 6, and thereby draw the two heads more tightly together for the purpose of compressing the gaskets to make the desired tight joint. This expedient is commonly successful in producing the desired tight joint; but the two heads are thereby so tightly locked together as to require the application of great force for the purpose of uncoupling the same. The application of this excessive force results in breakage of the hose-sections, and hose-sections of couplings so wedged together are also broken and rendered useless by the accidental parting of trains. These hose-sections are costly and heavy loss and expense are incurred by the breakage thereof caused by thus locking the couplings together. To prevent the trainmen from thus locking and wedging the coupling-heads together, I have provided guard-flanges or shields so arranged that nails or other foreign bodies cannot be inserted between the interlocking hooks of the two heads, and to remove the cause that is to cure loose or leaking joints between the coupling-heads I have provided each head with an auxiliary compressing or locking device to act on the end hook of the opposite head and have arranged these auxiliary compressing devices so that the coupling or interlocking of the two heads can be accomplished independently thereof, whereby said auxiliary devices need only be used or thrown into action when necessary by reason of the condition of the gaskets.

8 is a segmental guard-flange arranged at the outer end of each head and adjacent to the outer face thereof. This guard-flange 8 is arranged approximately parallel with the hook 5, but is longer than the same and is separated a distance therefrom, and the transverse guard wall or abutment 9 extends from one end of flange 8 to the corresponding end of hook 5.

10 is a curved guide or guard plate or flange arranged about concentrically with the curved edges of the hooks 5 6 and the axial opening and extending around in continuation of the outer wall of the hook 6. The arrangement of these guard flanges and plates is such that when the two heads move axially into coupled position the hooks 5 slip under hooks 6 and the flanges 8 slip over the outer faces of the hooks 6 until the free ends of the hooks 5 engage the walls 7 and the ends of the hooks 6 opposite the walls 7 approximately engage the wall 9. As the coupling-heads are first brought together in the initial movement of the coupling operation the outer edges of the hooks 5 and the flanges 8 are brought against the curved inner faces of the guide or guard plates 10, and as the heads are rocked axially said plates 10 guide the said hooks and flanges so that the hooks 6 slide between the hooks 5 and flanges 8. It will hence be observed that the radius of the plates 10 is approximately of the same length as the radius of the curved outer edges of the hooks 5 and flanges 8 and that each plate 10 extends from the open end of a hook 6 and partially surrounds the inner face 2 of the head and that each plate 10 in width is not less than the width or thickness of the outer end of the head. The plates 10 prevent the insertion of nails or other foreign bodies between the hooks 5 and 6 as they are moving into coupled position and with the flanges 8 and end walls 7 and 9 prevent the entrance of nails or the like between the hooks 5 and 6 when the heads are in coupled position.

The auxiliary locking or compressing device can be variously arranged and constructed to accomplish the purpose intended. In the drawings I show what at present I consider a preferred arrangement of compressing device, and the coupling-heads are provided with similar compressing devices. In carrying out this feature of my invention I show each head partially cut away in rear of the hook 6, or it might be said that the rear wall of the hook 6 is removed and a box or housing 11 is arranged in rear of the hook 6 and is preferably open at the front and rear. In this box or housing I arrange a slidable block or head 12, capable of movement in a direction at right angles to the plane of the inner face 2 of the coupling-head. The inner face of this block or head is provided with a strong transverse shoulder, lip, or flange 13, rigid therewith and arranged to move inwardly or toward the face 2 through the hook 6 and engage the outer face or edge of the hook 5 and press the same toward the opposite coupling-head.

Any suitable means can be employed for reciprocating the compressing-block 12, and as an example I show a rotary shaft or bolt 14, having an external screw-thread and passing loosely through an internally-threaded bore 15, through the block 12, with said screw-threaded portions of the shaft and block meshing. The inner end of the shaft is mounted in a suitable step-bearing 16 in the floor of the box or housing. The threaded shaft is free to rotate in either direction in the block and housing, and any suitable device is employed to confine the same therein against longitudinal movement. For instance, I show a bearing-ring 17, in which the reduced outer end of the shaft 14 is mounted to turn, and the inner end of this ring bears against annular shoulder 18 of the shaft to hold the shaft in proper longitudinal position, and this ring is externally threaded and screws into a threaded opening in the outer end of box or housing. The side walls of the housing hold the sliding box against oscillating, and hence rotation of the shaft 14 reciprocates the block. The block can be removed in case of necessity by unscrewing the ring 17 and removing the screw-shaft from the block, whereupon the block can be slipped out through the open rear side of the box or housing. The parts can be as readily assembled.

Any suitable means can be provided for oscillating the screw-shaft. For instance, I show a laterally-extending handle 19, rigid with the outer end of the shaft.

When the gaskets are in proper or normal condition, the auxiliary compressing devices need not be operated, but can be left in inoperative position, with the compressing-blocks moved outwardly to throw their hook-engaging shoulders outwardly beyond the paths of movement of the hooks 5, and the coupling-heads can be operated in the ordinary manner in coupling and uncoupling. However, whenever leakage is detected between the coupled heads, showing that the gaskets are worn or defective, it is only necessary to swing the handles 19 toward each other—that is, into inclined positions over the two heads (see Fig. 1)—and the screw-shafts will thereupon force the blocks inwardly, and the hook-engaging shoulders of said blocks will engage the hooks 5 and forcibly press the two coupling-heads together to tightly compress the gaskets together until the leakage is stopped and the tight joint desired is attained. When in operative position, it is desirable that the two handles 19 incline upwardly in opposite directions toward each other, so that the jar and movement of the coupling-heads when the train is in motion tend to move the handles downwardly, which is in the direction to more firmly press the blocks against the hooks and hold the heads together. If the cars should accidentally separate while the auxiliary compression devices are thus applied, the coupling-heads will separate as ordinarily, as the hooks 5 can in that event slip from under the shoulders of the blocks as said hooks slip from under the hooks 6.

When it is desired to uncouple the heads, the handles 19 are first swung upwardly to force the blocks outwardly, and then the heads can be uncoupled by hand in the ordinary manner. When the heads are to be coupled, the coupling operation is performed as ordinarily, and after the heads have been coupled the handles 19 are swung downwardly and toward each other to apply the compressing-blocks.

The housing or box and the guard flanges and plate and the hooks can be cast integral with the head and the compressing-block and attached parts and operating devices can be strongly made of any suitable durable material.

It is evident that various changes and modifications might be resorted to without departing from the spirit and scope of my invention. Hence I do not wish to limit myself to the exact constructions illustrated.

What I claim is—

1. A hose-coupling comprising two heads having hooks adapted to interlock and provided with guard-flanges closing access to the engaging faces of the hooks when the heads are coupled, substantially as described.

2. A hose-coupling comprising two heads, each head having hooks and guards arranged adjacent to the hooks to prevent insertion of wedging bodies between the hooks of the coupled heads, substantially as described.

3. A hose-coupling comprising similar coupling-heads, each head having the coupling-hooks and end guard-walls therefor, a curved guard and guide plate, and a guard-flange arranged at the outer end of the head to lap over the side hook of the opposite head when the heads are coupled together, substantially as described.

4. A hose-coupling comprising the coupling-heads, each head having the outer end hook and the overhanging hook at its inner face arranged to receive the outer end hook of the opposite member, and guards arranged with respect to said hooks to prevent access to the engaging faces of said hooks when the heads are coupled.

5. A hose-coupling comprising two heads, each head having the curved outer end hook, and the curved inner hook overhanging the inner face of the head to receive the outer hook of the opposite head, and the curved guide and guard plate extending from said inner hook partially around the head, said plates of the two heads coöperating with said outer end hooks during the coupling operation and guarding said hooks when coupled.

6. A hose-coupling comprising two similar heads movable axially on each other in coupling and uncoupling each head having the curved outer end hook and the overhanging inner hook to receive the outer end hook of the opposite head, and a curved guard-flange arranged at the outer end of the head and adjacent to and separated from said outer end hook, said flange and outer end hook arranged to receive between them the inner hook of the opposite coupling-head, substantially as described.

7. A hose-coupling comprising two similar coupling-heads movable axially in coupling and uncoupling and having the side axial ports, each head having an outer end hook and an inner hook to receive the outer end hook of the opposite head, a stop and guard wall arranged at one end of said inner hook to engage the end of the outer end hook of the opposite head, and a stop and guard wall arranged at one end of the outer end hook to engage one end of the inner hook of the opposite head, said stop and guard walls arranged at opposite ends of the interlocking hooks when coupled to prevent insertion of wedges, or the like, between the engaging faces of said hooks.

8. A hose-coupling comprising two similar coupling-heads movable axially in coupling and uncoupling, each head having an axial port through its inner face and a packing-gasket, an outer end hook, an inner hook arranged to receive the outer end hook of the opposite head, and a normally inoperative auxiliary compressing device provided with manual operating means and arranged to engage the outer end hook of the opposite head, whereby the heads can be coupled and uncoupled independently of said compressing device, substantially as described.

9. A hose-coupling comprising two coupling-heads movable axially in coupling and uncoupling and having the side ports and gaskets, each head having complete coupling members or hooks, and an auxiliary manually-operated compressing device, said coupling members or hooks capable of coupling the heads together independently of said compressing devices of the heads.

10. A hose-coupling comprising two similar coupling-heads having side ports and gaskets, each head having coupling hooks or members, and an auxiliary manually-operated compressing device comprising a housing rigid with the head, a slidable block therein having a hook-engaging shoulder, and manually-operated means for reciprocating said block, substantially as described.

11. A hose-coupling comprising axially-movable coupling-heads, each head having a port through its side face and a gasket, an outer end coupling-hook, an inner or side face coupling-hook adapted to receive the outer end hook of the opposite head, and a sliding block arranged in rear of said inner hook and having a shoulder arranged to move through said hook to engage the end hook of the opposite head, said block provided with manually-actuated operating means for reciprocating and locking the same.

12. A coupling comprising a pair of coupling-heads, each having an axial port and gasket, an outer end coupling-hook, an inner or side coupling-hook to receive the end hook of the opposite head, said inner hook being partially cut away at the rear, a housing rigid with the head and arranged at the rear of said inner hook and open at the front and rear, a removable sliding block in said housing and arranged to project through said inner hook and engage the end hook of the opposite head, a removable threaded actuating-shaft passing through and actuating said block, means to confine said shaft in the block and housing, and a handle on the outer end of said shaft.

In testimony whereof I affix my signature in presence of two witnesses.

MURRAY HENDRICKS.

Witnesses:
   HUBERT E. PECK,
   HERBERT C. EMERY.